United States Patent [19]

Balasubramanian et al.

[11] Patent Number: 5,010,157

[45] Date of Patent: Apr. 23, 1991

[54] PROCESS FOR PREPARING ORGANOSILAZANES

[75] Inventors: Mannarsamy Balasubramanian; Pranab Choudhury, both of Baton Rouge, La.

[73] Assignee: Ethyl Corporation, Richmond, Va.

[21] Appl. No.: 374,665

[22] Filed: Jun. 30, 1989

[51] Int. Cl.$^5$ .............................................. C08G 77/06
[52] U.S. Cl. ........................................ 528/14; 528/10; 528/31; 528/38
[58] Field of Search ........................ 528/10, 14, 38, 31

[56] References Cited

U.S. PATENT DOCUMENTS 4,482,669  11/1984  Seyferth et al. ................... 524/442
4,771,118   9/1988  Takamizawa et al. ............... 528/14

OTHER PUBLICATIONS

Blum et al., Catalytic Methods for the Synthesis of Oligosilazanes, Organometallics, 1986, 5, 2081-2086.
Zoeckler et al., Homogeneous Catalytic Formation of Carbon-Nitrogen Bonds, J. Org. Chem. 1953, 48, 2539-2543.

Primary Examiner—Melvyn I. Marquis
Attorney, Agent, or Firm—Patricia J. Hogan

[57] ABSTRACT

Organosilazanes having higher prepolymerization molecular weights are prepared by subjecting to elevated temperatures in a dry atmosphere the total reaction mixture resulting from the ammonolysis of an organohalosilane in an organic solvent. Their higher molecular weights expedite the polymerization of the organosilazanes to preceramic polysilazanes.

6 Claims, No Drawings

PROCESS FOR PREPARING ORGANOSILAZANES

FIELD OF THE INVENTION

This invention relates to organosilazanes and more particularly to a process for increasing their molecular weights.

BACKGROUND

As disclosed, e.g., in U.S. Pat. Nos. 4,482,669 (Seyferth et al.) and 4,771,118 (Takamizawa et al.) and in Zoeckler et al., *Journal of Organic Chemistry*, Volume 48, pp. 2539-2541 (1983), and Blum et al., *Organometallics*, Volume 5, No. 10, pp. 2081-2086 (1986), it is known that organosilazanes are useful in the synthesis of organosilazane polymers and that they can be prepared by reacting an organohalosilane with ammonia in an organic solvent at a temperature in the range of 0° C. to −20° C.

It has now been discovered that the molecular weights of polysilazanes synthesized by the polymerization of such organosilazanes are dependent on the molecular weights of the organosilazanes as well as on the polymerization time and that the use of a lower molecular weight organosilazane necessitates a longer polymerization time to achieve a desired polysilazane molecular weight. It would therefore be desirable to find a means of increasing the molecular weights of organosilazanes prepared by an ammonolysis reaction.

Copending application Ser. No. (374,058) (Balasubramanian et al.), filed June 30, 1989, teaches that temperatures higher than 0° C. can also be used for the ammonolysis of organohalosilanes and that the use of temperatures in the range of about 15°-20° C. leads to an increase in the molecular weights of the organosilazane products.

SUMMARY OF INVENTION

An object of this invention is to provide a novel process for increasing the molecular weight of an organosilazane prepared by the ammonolysis of an organohalosilane in an organic solvent.

Another object is to provide such a process which reduces the time required to polymerize the organosilazane to a polysilazane having a desired molecular weight.

These and other objects are attained by heating at a temperature of at least about 40° C. in a dry atmosphere an organosilazane solution which is the total reaction mixture resulting from the ammonolysis of an organohalosilane in an organic solvent, the heating being continued until the molecular weight of the organosilazane is increased to the desired level.

DETAILED DESCRIPTION

Except for its being followed by a period at elevated temperature and its possibly utilizing higher temperatures than have been employed in the past, the ammonolysis is conducted by known techniques, such as those of Seyferth et al. and Takamizawa et al., the teachings of both of which are incorporated herein in toto by reference. Thus, the organohalosilane may be any such compound capable of reacting with ammonia to form an organosilazane but is preferably one or more compounds selected from organodihalosilanes and organotrihalosilanes and is most preferably methyldichlorosilane. Also, the solvent may be any suitable organic solvent but is usually a hydrocarbon, such as pentane, hexane, benzene, toluene, xylene, etc., or an ether, such as diethyl ether, tetrahydrofuran, tetrahydropyran, 1,4-dioxane, etc., and is preferably tetrahydrofuran. Moreover, as in the known reactions, it is desirable to feed the ammonia at a rate such as to permit control of the exothermic reaction and to conduct the reaction in a dry atmosphere. However, as indicated above, the ammonolysis temperature employed is not necessarily limited to conventional temperatures in the range of 0° C. to −20° C. but may be any temperature at which the ammonolysis will occur. For example, the temperature may be as low as −20° C. or as high as about 40° C. or even higher, although the use of ammonolysis temperatures higher than 20° C. leads to a decrease in the molecular weight of the organosilazane.

The organosilazane solution which is subjected to elevated temperatures (preferably the reflux temperature of the solvent) is the total reaction mixture resulting from the ammonolysis reaction, i.e., a reaction mixture containing byproduct ammonium halide as well as the organosilazane and solvent. The time required for the heating step varies with the molecular weight desired and with the particular molecular weight of the organosilazane prior to the heating step, longer times being required to reach higher molecular weights, and longer times being required to increase the molecular weights of the lowest molecular weight organosilazanes to a particular level. However, it is generally preferred to maintain the organosilazane solution at an elevated temperature for at least one hour, generally for about 1-10 hours.

After completion of the period at elevated temperature, the organosilazane produced may be polymerized to a polysilazane by known techniques, such as those of Seyferth et al. or Takamizawa et al. or analogous processes using the transition metal catalysts of Zoeckler et al. or Blum et al., the teachings of both of which are incorporated herein by reference. In the polymerization processes the organosilazanes prepared by the ammonolysis/heating process of the present invention have the advantage of polymerizing to a given molecular weight in a shorter time or polymerizing to a higher molecular weight in a given time than the lower molecular weight organosilazanes which have not been subjected to the heating step.

The following examples are given to illustrate the invention and are not intended as a limitation thereof.

EXAMPLE I

Part A

A suitable reaction vessel was charged with about 540 g of anhydrous tetrahydrofuran at about 30° C., after which 51.2 g (0.45 mol) of methyldichlorosilane was added, and stirring at about 300 rpm was begun. A slow steady stream of 25.9 g (1.52 mols) of anhydrous ammonia gas was introduced into the vessel at a flow rate such that the reaction temperature stayed at about 30° C. Then the reaction mixture was stirred at 30° C. for about 24 hours, after which the coolant flow to the reactor jacket was shut off, and the system was put under gentle nitrogen purge to allow the majority of the excess ammonia to vent off. Next the molecular weight of the product was measured by GPC and determined to be 240.

Part B

The reaction product slurry of Part A containing ammonium chloride by-product was refluxed under nitrogen for seven hours, during which time the molecular weight of the product was monitored by sampling at certain intervals and determining the molecular weight by GPC. The molecular weights determined are shown below.

| Reflux Time (hrs.) | GPC Molecular Weight |
| --- | --- |
| 0 | 240 |
| 1 | 300 |
| 3 | 360 |
| 7 | 360+ |

EXAMPLE II

Example I was repeated except that the ammonolysis reaction was conducted on a larger scale, the temperature was maintained at about $-15°$ C. to $15°$ C. instead of at $30°$ C., and the reflux step was conducted for two hours. Prior to refluxing the molecular weight of the product was determined to be 260, and after refluxing the molecular weight of the product was determined to be 310.

EXAMPLE III

Part A

A portion of the ammonolysis product slurry of Example II (i.e., the slurry containing an organosilazane having a GPC molecular weight of 260) was filtered through a 0.2-micrometer filter. The clear filtrate (512 g) was discharged into a polymerization vessel and chilled to $0°$ C., and 0.36 g (about 0.5 mol %) of potassium hydride powder was added to begin polymerization. The reaction mixture was maintained at $0°$ C. for 22 hours, after which the reaction was quenched by the addition of 4.25 g of dimethylchlorosilane to the polymerization solution. The solution was then allowed to warm gradually to about $22°$ C. After about 24 hours, ammonia gas was purged through the solution to neutralize the excess quenching agent, and the resulting solution was filtered through a 0.2-micrometer filter. The molecular weight of the polymer was determined by GPC to be 10,100.

Part B

Part A was repeated except that the filtered organosilazane which was polymerized was obtained from the final product of Example II, i.e., the slurry containing an organosilazane having a GPC molecular weight of 310. The molecular weight of the polymer was determined by GPC to be 20,000.

The preceding examples demonstrate that the heating step of the invention results in increasing the molecular weight of the organosilazane, regardless of whether it is a low molecular weight organosilazane which has been prepared at an ammonolysis temperature of $30°$ C. or a somewhat higher molecular weight organosilazane which has been prepared at a lower ammonolysis temperature, and that the organosilazanes having the increased molecular weights provide higher molecular weight polymers when subjected to polymerization conditions. The following example demonstrates the need to retain the ammonium halide by-product of the ammonolysis reaction in the mixture which is subjected to the heating step in order to achieve the objectives of the invention.

COMPARATIVE EXAMPLE

Example II was repeated except that the product of the ammonolysis reaction was filtered through a 0.2-micrometer filter to remove the ammonium chloride by-product prior to the heating step, and the refluxing was continued for 24 hours. GPC traces of the products before and after the refluxing were superimposable, indicating that there was no significant increase in molecular weight.

It is obvious that many variations may be made in the products and processes set forth above without departing from the spirit and scope of this invention.

What is claimed is:

1. A process which comprises heating at a temperature of at least about $40°$ C. in a dry atmosphere a composition consisting of an organosilazane solution which is the total reaction mixture resulting from the ammonolysis of an organohalosilane in an organic solvent, the heating being continued until the molecular weight of the organosilazane is increased.

2. The process of claim 1 wherein the organosilazane solution is the total reaction mixture resulting from the ammonolysis of methyldichlorosilane in tetrahydrofuran and is refluxed for at least about one hour.

3. A process which comprises reacting an organohalosilane with ammonia in an organic solvent at a temperature in the range of about $-20°$ C. to about $40°$ C. to form an organosilazane and heating a composition consisting of the resultant reaction mixture at a temperature of at least $40°$ C. until the molecular weight of the organosilazane is increased.

4. The process of claim 3 wherein methyldichlorosilane is reacted with ammonia in tetrahydrofuran and the resultant reaction mixture is refluxed for at least about one hour.

5. In a process for preparing a polysilazane by reacting an organohalosilane with ammonia in an organic solvent at a temperature in the range of about $-20°$ C. to about $40°$ C. to form an organosilazane, adding a catalyst to the resultant reaction mixture, and polymerizing the organosilazane, the improvement which comprises heating the reaction mixture containing the organosilazane at a temperature of at least $40°$ C. to increase its molecular weight prior to the addition of the catalyst.

6. The process of claim 5 wherein methyldichlorosilane is reacted with ammonia in tetrahydrofuran, the catalyst is potassium hydride, and the reaction mixture containing the organosilazane is refluxed for at least about one hour before the catalyst is added.

* * * * *